G. A. HEATHERBELL.
AUTOMATIC TRAP NEST.
APPLICATION FILED JAN. 17, 1916.

1,221,175.  
Patented Apr. 3, 1917.

WITNESSES  
Edw. S. Hall.  
Wm. Webster Downing.

INVENTOR  
George A. Heatherbell.  
BY Richard B. Owen.  
ATTORNEY

UNITED STATES PATENT OFFICE.

GEORGE A. HEATHERBELL, OF DEEP BAY, PORT CYGNET, TASMANIA, AUSTRALIA.

AUTOMATIC TRAP-NEST.

1,221,175.     Specification of Letters Patent.     Patented Apr. 3, 1917.

Application filed January 17, 1916. Serial No. 72,598.

*To all whom it may concern:*

Be it known that I, GEORGE A. HEATHERBELL, a subject of the King of Great Britain, residing at Deep Bay, Port Cygnet, Tasmania, Australia, have invented certain new and useful Improvements in Automatic Trap-Nests, of which the following is a specification.

My invention relates to nests and more particularly to an automatic trap nest for poultry.

The primary object of my invention resides in the provision of a nest having improved means movably mounted within the nest casing for automatically closing the door after a hen has passed through the opening and disposed her weight upon the movably mounted operating means, thereby providing a device wherein one hen can lay at a time.

Another object of my invention resides in the provision of an improved nest for facilitating the separating of laying hens from the non-laying hens, the nest being preferably placed between a fence or wall and having the exit opening communicating with the yard in which the laying hens are retained, the hen being prevented from escaping from this yard because of the fact that when her weight is disposed upon the movably operated means, the entrance opening will be closed.

Another object of my invention resides in the provision of a nest wherein the operating means will efficiently operate on the lightest of hens, the operating means also closing the opening when a certain number of eggs have been laid in the nest, for instance, a dozen.

A further object of my invention resides in the arrangement of the movable operating means and the closing means, the latter being moved into an open position as soon as the hen which was on the nest has left the nest compartment and entered the yard for retaining the laying hens.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claim forming a part of this specification.

Figure 1:
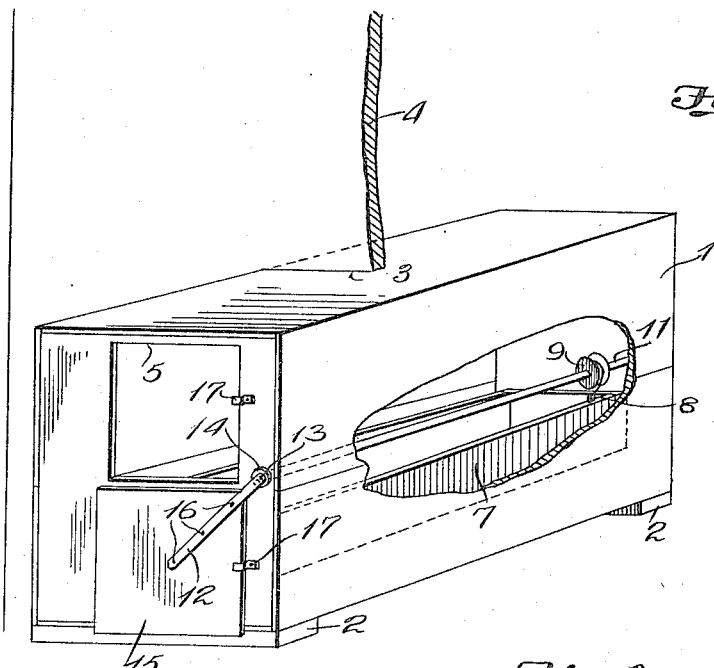
Figure 1 is a perspective view of my invention showing the nest arranged in an open position.
Figure 2:
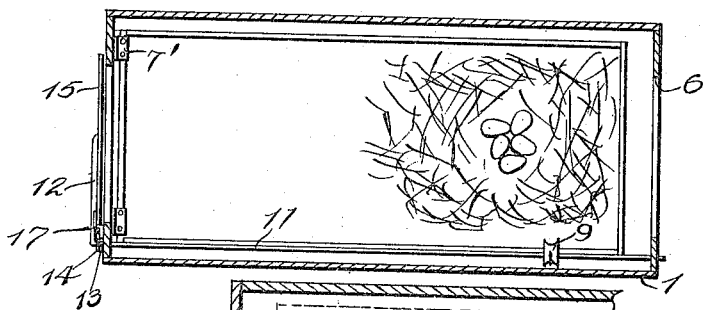
Fig. 2 is a longitudinal sectional view of my invention.
Figure 3:
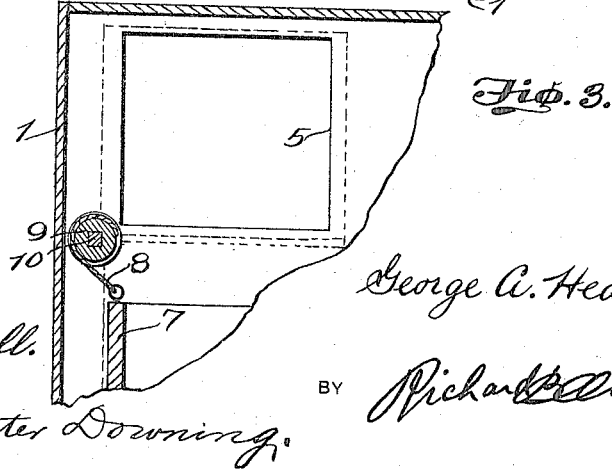
Fig. 3 is an enlarged fragmentary transverse sectional view of my invention illustrating to advantage the construction and arrangement of the operating shaft and the means for connecting the nest frame therewith.

Referring more particularly to the drawings in which similar reference numerals designate like or corresponding parts throughout the different views, I provide a rectangular casing or compartment 1, having transverse feet 2 arranged on the bottom thereof to facilitate the supporting of the casing, the latter being preferably arranged in an opening 3 in a fence 4. The front end of the casing is provided with a preferably square opening 5 adjacent the upper end thereof which serves as a means for permitting hens to enter the casing while the rear end of the compartment is provided with an exit opening 6 to permit the laying hens to enter the yard, not shown, which is inclosed by the fence 4 for retaining the laying hens therein, thereby separating them from the non-laying hens.

For the purpose of automatically closing the entrance opening 5 after a hen has passed therethrough, I have provided an elongated rectangular nest frame or platform 7, one end of which is pivotally mounted slightly beneath the entrance opening and above the bottom of the casing through the medium of hinges 7'. One side of the nest frame has one end of a cord or cable 8 connected thereto, the opposite end of the cable being rigidly connected to a pulley wheel 9, the latter in turn being rigidly mounted on the squared portion 10 of the rotatably mounted and longitudinally extending shaft 11. The respective ends of the shaft 11 are journaled in the ends of the casing adjacent one side thereof and approximately above the side of the nest frame 7 to which is connected the cable. The forward end of the shaft 11 is extended through the forward end of the casing and bent at right angles and flattened to provide a laterally extending arm 12, the projecting end of the shaft being first engaged by a washer 13 which is secured to the front face of the forward end about the opening and also by another washer 14 which is carried by the arm at its point of distortion, said washers serving as bearings for the arm. A preferably square door 15 is arranged beneath the entrance opening 5 and has the arm 12 connected diagonally to its outer surface through the medium of suitable fastening devices 16. It will now be understood and apparent that this door besides serving as a closure for the opening 5 acts as a weight for normally maintaining the nest frame 7 in a raised position so that it may be moved downwardly when the weight of a hen is disposed thereon. In order to limit the swinging movement of the door 15, I have provided limit stops 17, said stops being rigidly connected to the outer surfaces of the forward end of the casing adjacent the opening 5 and substantially directly beneath the projecting end of the shaft. Each of these limit stops have their free ends offset to provide shoulders for limiting the movement of the door during its swinging movement as well as preventing transverse movement thereof.

The operation of my invention is as follows:

Normally the weight of the door 15 retains the free end of the nest frame in a raised position. When a hen enters the entrance opening 5 and disposes her weight upon the nest frame, the latter will swing downwardly about its pivot point, the cable 8 being rigidly connected to the drum and nest frame, and the drum being rigidly connected to the rotatably mounted shaft, causes the shaft to rotate and the arm 12 to swing upwardly. The door is carried by the arm and closes the entrance opening 5, being prevented from passing the opening through the medium of the stop 17. The only way in which the hen can get out of the nest is through the rear opening 6. This is preferably arranged in communication with a yard for retaining laying hens. After the hen passes into this yard the door will swing downwardly due to its weight and will allow the nest frame to be again raised. This nest frame will automatically move to its lowermost position and cause the opening 5 to be closed when a certain number of eggs have been laid in the nest, preferably a dozen.

Although I have shown and described the preferred embodiment of my invention I desire to be understood that I am not to be limited to the exact details shown, however, I desire that great stress be laid upon the arrangement and coöperation of the movably mounted nest frame for operating the door when the weight of a hen is disposed on the frame, the door, because of its weight automatically returning the nest to a raised position when a fowl has left the nest, to permit of a subsequent operation of the nest.

From the above description taken in connection with the accompanying drawings, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the preferred embodiment of my invention and that various minor changes in detail of construction, proportion and arrangement of the parts may be made within the scope of the appended claim and without sacrificing any of the advantages of my invention.

Having thus fully described my invention, what I claim as new and desire to secure by Letters Patent, is:

An automatic trap nest including a rectangular casing having an entrance opening in the forward end adjacent the top and an exit opening in the opposite end thereof, a longitudinally arranged shaft rotatably mounted in the respective ends of the casing adjacent one side, a pulley wheel carried by the shaft adjacent the rear end, an elongated rectangular nest frame having one end pivoted to the inner surface of the forward end of the compartment slightly below the entrance opening and above the bottom of the casing, a cable connected to the free end of the nest frame and trained about and connected to the pulley wheel, an arm formed by bending the projecting end of the shaft at a right angle to the longitudinal axis thereof, a door connected to the arm and arranged exteriorily of the front end of the casing serving as a weight to normally maintain the nest frame in a raised position but adapted to close the entrance opening when a fowl has disposed its weight upon the nest frame, means for limiting the outward swinging movement of the door and for maintaining one edge of the door parallel with and beneath the bottom of the entrance opening, and means for limiting the upward swinging movement of the door to prevent the door from moving beyond the entrance opening.

In testimony whereof I affix my signature in presence of two witnesses.

GEORGE A. HEATHERBELL.

Witnesses:
EFFIE C. THIRLWALL,
W. E. HEATHERBELL.

Copies of this patent may be obtained for five cents each, by addressing the "Commissioner of Patents, Washington, D. C."